(12) United States Patent
Hains et al.

(10) Patent No.: US 6,208,430 B1
(45) Date of Patent: Mar. 27, 2001

(54) INCREASED FUNCTIONALITY FOR HOLLADAY HALFTONING

(75) Inventors: Charles M. Hains, Altadena; Gwendolyn L. Hembrock, Redondo Beach; Chan Chang, Palos Verdes, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/003,733

(22) Filed: Jan. 7, 1998

(51) Int. Cl.⁷ .................................... G06K 9/36
(52) U.S. Cl. ............................. 358/1.9; 382/237
(58) Field of Search .................... 382/237, 270; 358/1.9, 434–436, 456–460, 466, 298

(56) References Cited

U.S. PATENT DOCUMENTS

| | | | |
|---|---|---|---|
| 4,706,077 | * 11/1987 | Roberts et al. | 340/728 |
| 4,734,787 | * 3/1988 | Hayashi | 358/293 |
| 4,920,501 | * 4/1990 | Sullivan et al. | 364/518 |
| 5,019,896 | * 5/1991 | Shimazaki | 358/75 |
| 5,642,439 | * 6/1997 | Sato et al. | 382/254 |
| 5,940,138 | * 8/1999 | Lowe | 348/574 |

* cited by examiner

Primary Examiner—Thomas D. Lee
Assistant Examiner—Stephen Brinich
(74) Attorney, Agent, or Firm—Robert Cunha

(57) ABSTRACT

A circuit which uses less memory to store halftone arrays in a high addressability printer by storing regular halftone arrays as low addressability arrays and by outputting each pixel a number of times, the number being the ratio of high to low addressability. For example, if a high addressability system uses 4 sub pixels for each pixel, then one value of each low addressability array is stored in one location and the halftone circuit is controlled to output that value 4 times, once for each sub pixel thus saving memory by a factor of 4.

2 Claims, 8 Drawing Sheets

17 LEVEL 0° DOT
Width: 4
Height: 4
Shift: 0
Thresholds: 16

19 LEVEL 45° DOT
Width: 6
Height: 3
Shift: 3
Thresholds: 18

18 LEVEL 14° DOT
Width: 17
Height: 1
Shift: 4
Thresholds: 17

INCREASED FUNCTIONALITY FOR HOLLADAY HALFTONING

BACKGROUND OF THE INVENTION

A circuit for storing low addressability halftone arrays for a high addressability printer in a reduced amount of memory by storing high addressability arrays at one location per sub pixel, and low addressability pixels at one location per pixel, and by arranging the halftone generator to output each low addressability pixel a number of times to match the number of sub pixels per pixel.

In a regular printer, halftone arrays are stored at one location per pixel. As each pixel is received, it is compared to the array output and then output as either a ONE or a ZERO, depending on the comparison. Then the next array value is compared to the next pixel, etc.

In a high addressability printer, each pixel is divided up into a number of sub pixels, and there is an array location for each. For a numerical example, assume an addressability factor of 4. Then each pixel will be divided up into 4 sub pixels, and four comparisons will be used to generate 4 sub pixels to be printed. The result is that the regular 4 by 4 array must now be 16 by 4, and more memory is needed.

A problem arises when large numbers of large dots, such as 128 by 128 pixels, are needed, in which case the amount of memory for the storage of all the arrays becomes excessive. A method of reducing the storage requirement is needed.

SUMMARY OF THE INVENTION

In this case some dots, such as clustered dots, can be stored as high addressability dots, and others, such as stochastic dots, can be stored as regular dots. For example, to continue the numerical example, there can be 16 by 4 high addressability dots, and 4 by 4 low addressability dots, the latter having a much reduced memory requirement. If this is true, there must be a change made to the system. In its most useful form, the original page description language which specifies the original images also contains a "hint" which specifies the halftone dot and its addressability. As the image goes through the page generation process, the hint is carried along and finally is applied to the halftone generator, where it is used to select the correct dot, and also is used to select the corresponding addressability.

The printer does not have a variable clock speed, assuming full time high addressability. However, the array circuit can be enabled to either output 4 threshold values for 4 clocks, or the same output value 4 times for 4 clocks. Thus, the low addressability arrays can be stored as regular arrays, in ¼ the amount of memory.

DETAILED DESCRIPTION OF THE INVENTION

Figure 1:
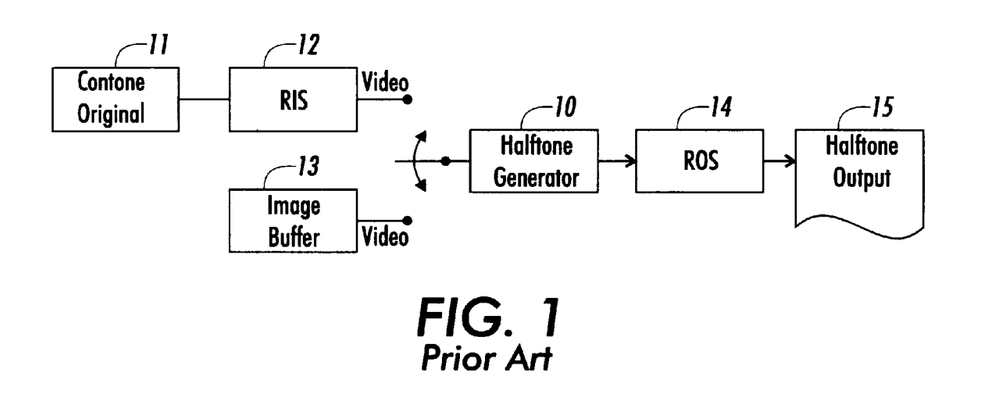
FIG. 1 is a prior art printing system for converting a contone image into halftone dots and printing or displaying the result on a raster output scanner.

FIG. 1 shows a system in which a halftone generator 10 can be used. A contone original 11 can be scanned by any commercial raster input scanner (RIS) 12 to produce a raster of pixels, each of a number of bits. The image could also be stored in an image buffer memory 13. In either case the image is transmitted as a series of pixels, one scan line at a time, to a halftone generator 10 where each group of neighboring pixels is converted into one halftone dot. The resultant series of dots are printed by a raster output scanner (ROS) printer 14 of any commercial kind onto paper as a halftone output 15, or in the alternative, is displayed on a terminal.

Figure 2:
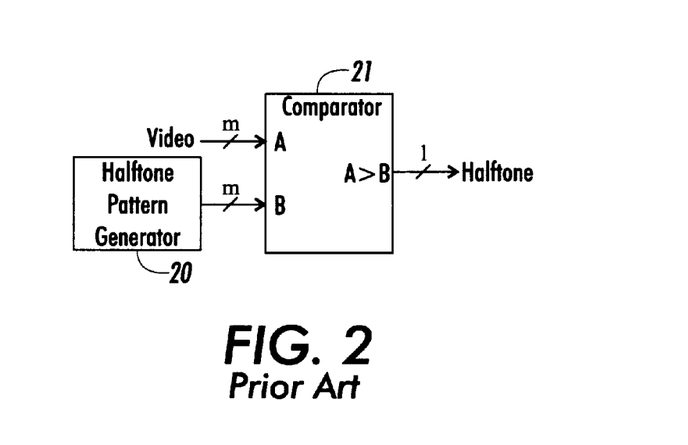
FIG. 2 shows more detail of the comparator of the halftone generator of FIG. 1.

The halftone generator is shown in more detail in FIG. 2. A halftone pattern generator 20 supplies a threshold value to the comparator 21 at the same time as each video pixel arrives, the two are compared, and a ONE or ZERO is output depending on whether the pixel is greater than the reference.

Figure 3:
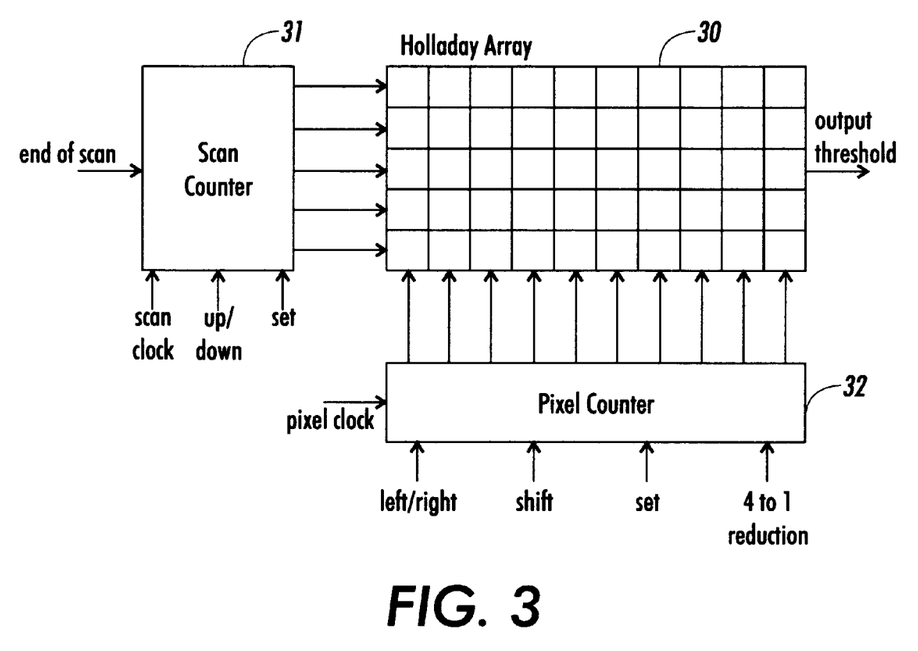
FIG. 3 shows one example of the storage of a Holladay brick in memory, and the surrounding circuitry.

FIG. 3 is one embodiment of the halftone pattern generator 10 of FIG. 2 shown in more detail. In this case the array 30 is shown as a 5 by 10 value array of threshold values arranged into rows and columns in a memory of any kind. During one scan clock period, the scan counter 31 will select one row and the pixel counter 32 will select one column of the array as the output threshold. On each scan clock thereafter, the row counter will cycle to the next row. The row counter also can initially be set to any scan line by the set line to set the phase of the dot pattern. Also, responsive to the up/down signal, the counter can count in either direction.

The pixel counter 32 cycles through the columns in response to the pixel clock, right or left in response to the left/right signal. At the end of the last scan line in a group with the height of the brick, the pixel counter will receive a control signal to indicate a shift of a number of pixels and the direction of the shift. The counter will make the correct number of shifts, and then wait for the beginning of the next scan to start selecting pixels again. In this way, the direction of vertical and horizontal cycling, and the amount and direction of shifts, is fully controllable. The counter can also be set to a particular starting pixel before the beginning of a scan by the set signal.

Figure 4:
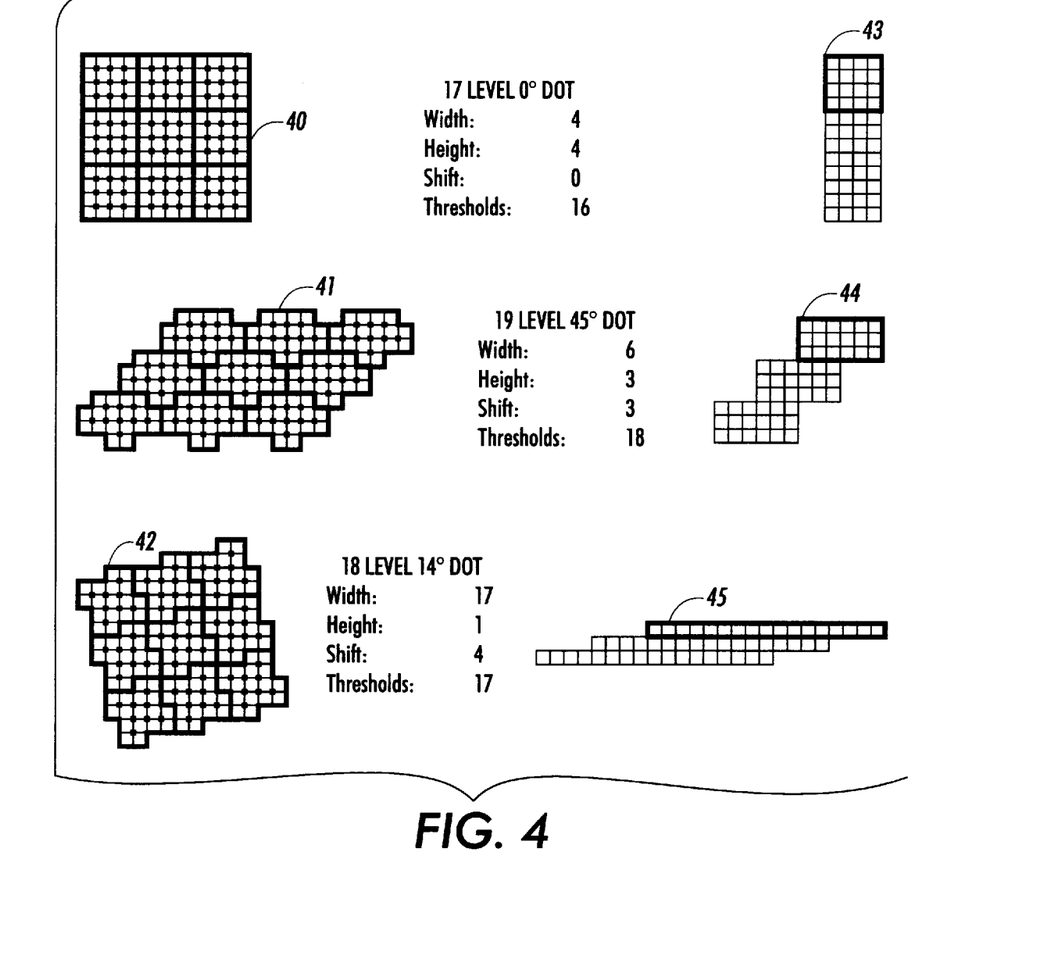
FIG. 4 shows three examples of how Holladay arrays can be used to generate various halftone dots.

FIG. 4 shows several forms of bricks and how they can be used to generate various sizes and patterns of dots. In the top row there is a 4 by 4 pixel brick 43 having 16 thresholds to provide 17 levels of color (0 to 16). Since there is no shift, each resulting visual dot pattern 40 is produced directly below the one above or directly to the right or left of the others in the row.

In the second row, the brick 44 has 3 rows and 6 columns to produce 19 levels of color. Since there is a shift of three pixels from the bottom of the first brick to the top of the next, and since the brick is 3 rows high, the angle along dot centers of the resultant dots 41 is 45 degrees as shown.

The final example at the bottom is a 1 by 17 brick 45 which can produce 18 levels of color. Since the height is 1 and the shift is 4, an angle of 14 degrees is produced between resulting dots 42.

Figure 5:
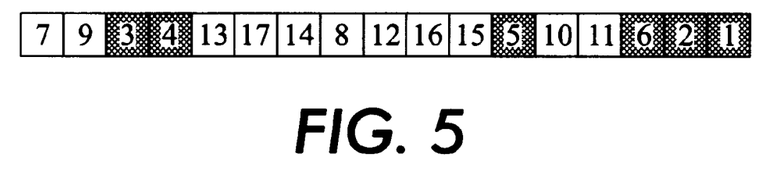
FIG. 5 is a single line of threshold values that can be used to form two or more dot patterns.
Figure 6:
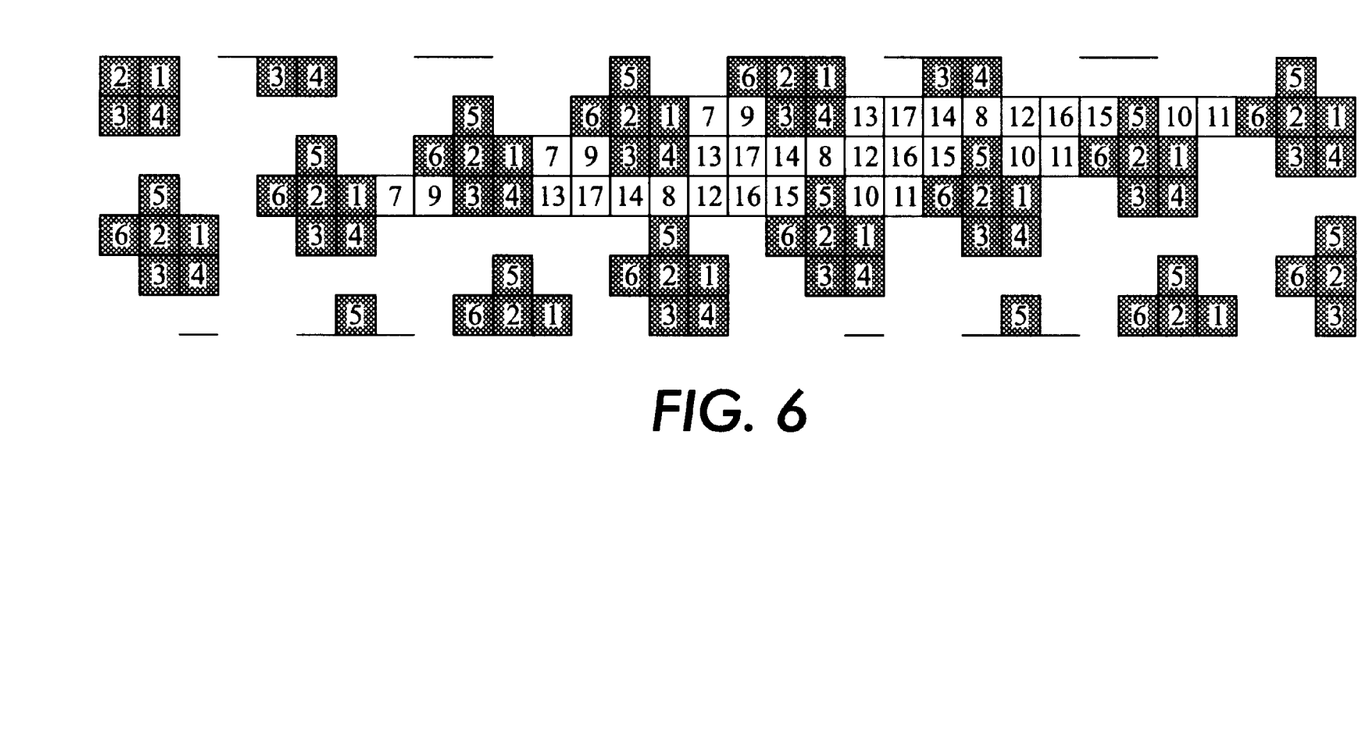
FIG. 6 is a dot pattern which counts from left to right and shifts left 4 pixels between rows of bricks to produce a 14 degree screen from the brick of FIG. 5.
Figure 7:
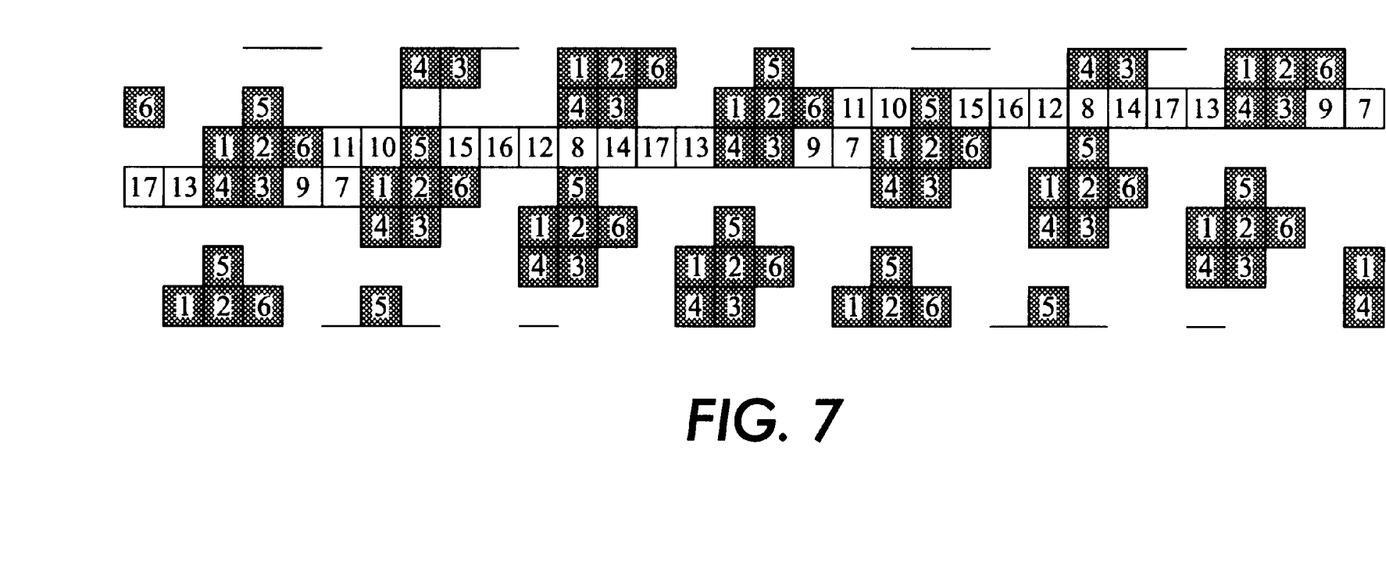
FIG. 7 is a dot pattern which counts from right to left and shifts left 13 pixels between rows of bricks to produce a 76 degree screen from the brick of FIG. 5.

FIGS. 5, 6 and 7 show how the single line brick of FIG. 5 can be used to produce two screens, shown in FIGS. 6 and 7. FIG. 5 shows a brick having one line of 17 threshold values. It is assumed that the video that is being compared to these reference values is between 6 and 7. Therefore values from 1 to 6 will be printed in black and all others will be printed in white, as shown.

On the first darkly outlined row of FIG. 6 is shown the same set of values, starting from "7, and proceeding from left to right. The next row of FIG. 6 is produced by shifting the brick 4 pixels to the left between scans, The "7" now appears one pixel below and 4 pixels to the left, resulting in a dot to dot angle of 14 degrees. For the next row, another shift of 4 pixels continues the pattern.

FIG. 7 shows how the same brick can also produce the mirror image of FIG. 6 by counting from pixel to pixel right to left (instead of left to right) and by shifting 13 to the left between scans (instead of 4 to the left) The result is now a dot to dot angle of 76 degrees. The two sets of dots can now be used for two separations in a four color printer, both being produced from the same brick to reduce memory requirements.

Figure 8:
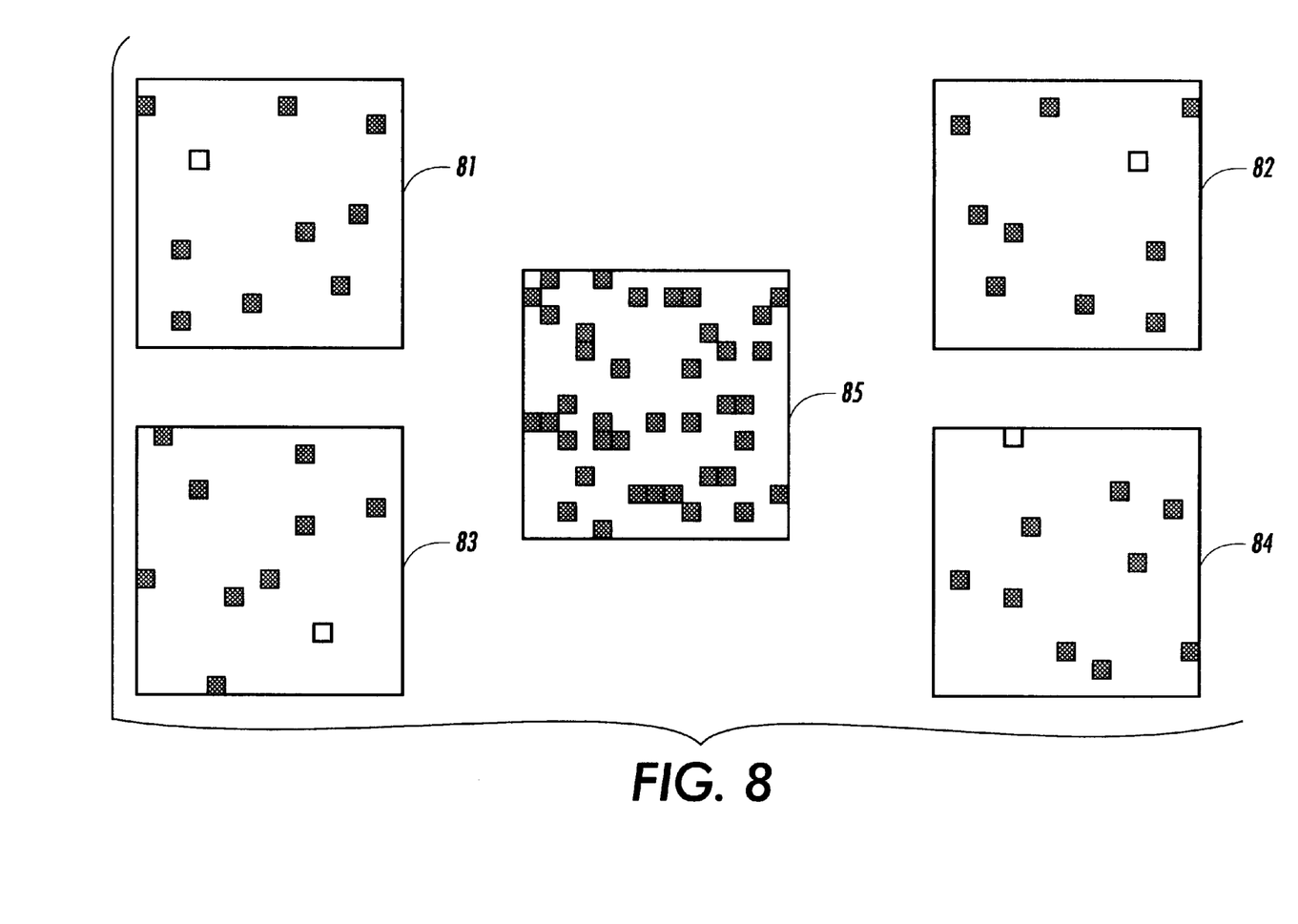
FIG. 8 shows how an original stochastic array can be used to form a mirror array, a phase-shifted array, a mirrored and phase-shifted array, and the over-laid result.

FIG. 8 shows how the same system can be used for stochastic dots. The original stochastic array 81 is shown as the first 9 black dots in an array that may be 128 by 128. Since these arrays are so large, there would be a great saving in memory if the same array could be used for the other three separations as well. This can be done by first using the original array counting from left to right. The mirror array 82 can be produced simply by counting from right to left. The phase-shifted array 83 can be produced by using the same brick and counting from left to right, but starting at a different row and column. Finally, a mirrored and phase-shifted array 84 can be made by producing the phase shifted array, but counting right to left. The four separations can now be printed to produce the over-laid result 85.

An additional consideration is that in a printer, it may be that stochastic dots will be required to be printed normally while clustered dots will need to be printed using high addressability. This is because clustered dots can use high addressability (4:1 and 8:1) in order to achieve more levels of grayscale, while stochastic screens tend to use less addressability (1:1 and 2:1) because of the extreme dot gain of isolated high-addressability pixels. Because of this, an implementation using both kinds of screens currently requires the low addressability stochastic screen to be "doubled up" to the same addressability as the other dots and the use of much more storage. The addition of a simple addressability parameter (i.e., 1, 2, 4 or 8) will allow compact storage of the stochastic screen in a high addressability implementation. The threshold array can then be clocked out redundantly by the hardware for the low addressability dots in order to allow the same hardware to be used for both kinds of dots.

Figure 9:
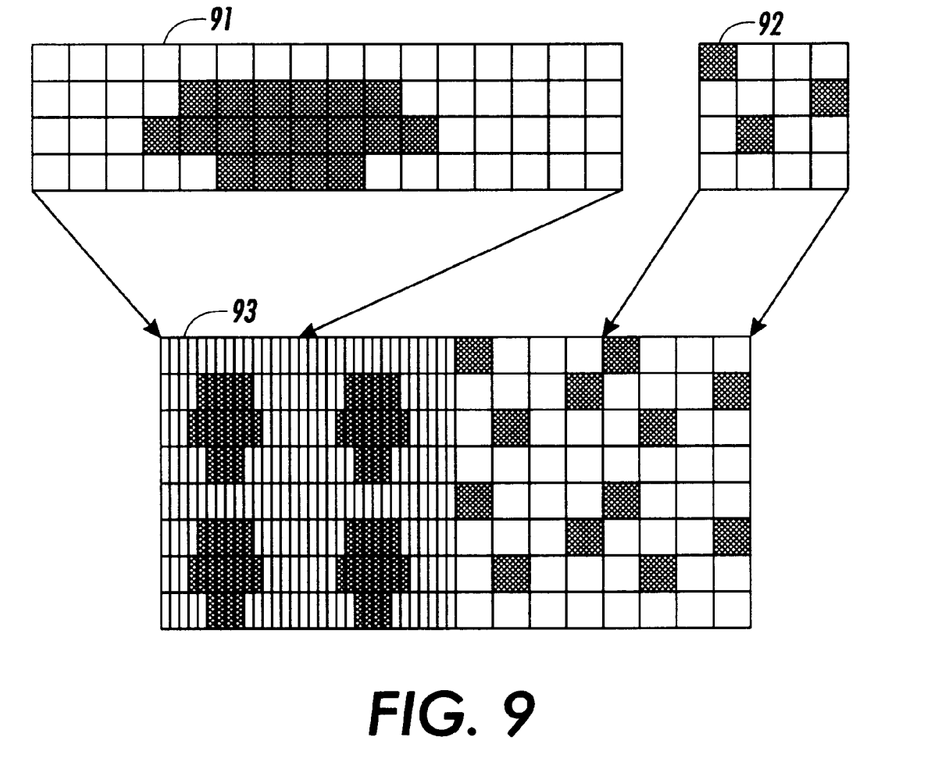
FIG. 9 shows how clustered dot and stochastic dot arrays can be stored in order to generate normal and high addressability outputs.

This is shown in FIG. 9. At the upper left is the clustered dot array 91 stored as a 16 by 4 brick, and at the upper right is the stochastic array 92 stored as a 4 by 4 brick. Four each of these dots are to be printed out as shown at the bottom of the figure. Assuming that the printer is running with a 4× high addressability clock for the clustered dots, the result is the pattern in the left half of the output. For the stochastic dot, the circuit is arranged so that the same output pixel is output 4 times for each pixel, resulting in the pattern in the right half of the output.

In terms of FIG. 3, the clock into the pixel counter 32 would be a 4× clock and when the stochastic dot is to be printed, responsive to the 4 to 1 reduction signal, the counter will only count up once for every 4 input clocks so that each pixel is output for each of 4 clock periods.

The prior art uses a constant clock and would need four times as much memory to store the stochastic dot. In this invention, a 4× clock and the non-redundant stochastic dot can be used.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A halftone circuit comprising:
   a memory containing an array of threshold values each having an address arranged in two or more rows,
   a cyclical row counter responsive to a scan clock for advancing the address to a next row in either direction, and
   a cyclical column counter responsive a sub pixel clock to advance the addressing to the next column once for each sub pixel clock for high addressability arrays, and to advance the addressing to the next column once for each number of sub pixel clocks for low addressability arrays, where the number is equal to the number of sub pixels per pixel.

2. A halftone circuit comprising:
   a memory containing an addressable array of threshold values arranged in one row, and
   a cyclical threshold counter responsive a sub pixel clock to advance the addressing to the next value once for each sub pixel clock for high addressability arrays, and to advance the addressing to the next value once for each number of sub pixel clocks for low addressability arrays, where the number is equal to the number of sub pixels per pixel.

* * * * *